United States Patent [19]

Stickler

[11] 4,392,262
[45] Jul. 12, 1983

[54] APPARATUS FOR BREEDING QUEEN HONEYBEES

[76] Inventor: Johann R. Stickler, Klammweg 68, Willendorf, Austria, A-2732

[21] Appl. No.: 312,715

[22] Filed: Oct. 19, 1981

[30] Foreign Application Priority Data

Oct. 17, 1980 [AT] Austria ................. 5169/80

[51] Int. Cl.³ .................. A01K 47/04; A01K 49/00
[52] U.S. Cl. ................................................. 6/9; 6/11
[58] Field of Search ....................... 6/2 R, 9, 10, 11

[56] References Cited

U.S. PATENT DOCUMENTS

| 92,348 | 7/1869 | Paddock | 6/10 |
| 1,397,830 | 11/1921 | Yates | 6/9 |
| 2,239,708 | 4/1941 | France | 6/11 |

FOREIGN PATENT DOCUMENTS

| 2328475 | 1/1975 | Fed. Rep. of Germany | 6/9 |
| 226055 | 12/1924 | United Kingdom | 6/9 |

Primary Examiner—Robert P. Swiatek
Attorney, Agent, or Firm—Kurt Kelman

[57] ABSTRACT

A breeding apparatus for queen honeybees comprises a breeding frame, a honeycomb cell plate affixed thereto and defining a multiplicity of open cells, a like multiplicity of sockets projecting from the rear face of the plate, the cells passing through the sockets, and cup-shaped elements detachably mounted on the sockets for closing the rear of the cells.

25 Claims, 11 Drawing Figures

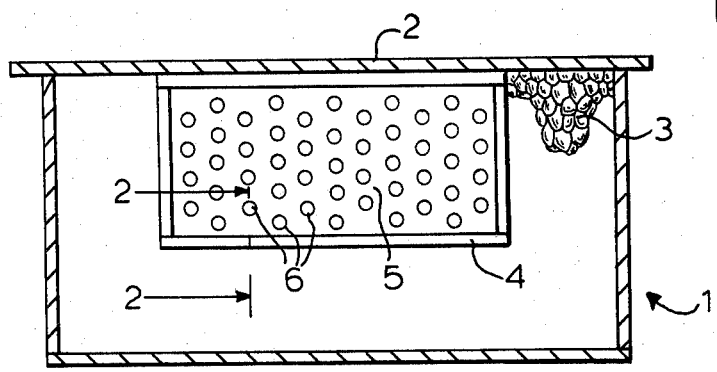
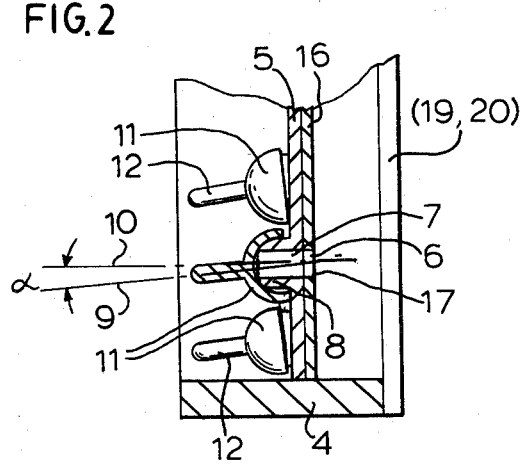
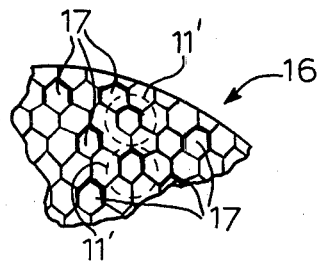
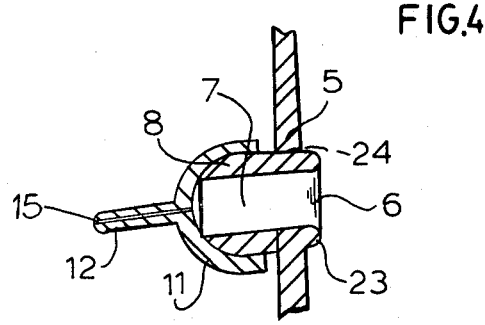
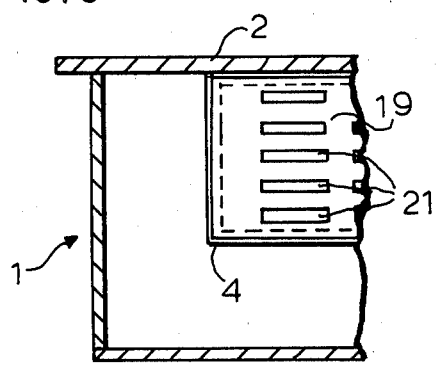
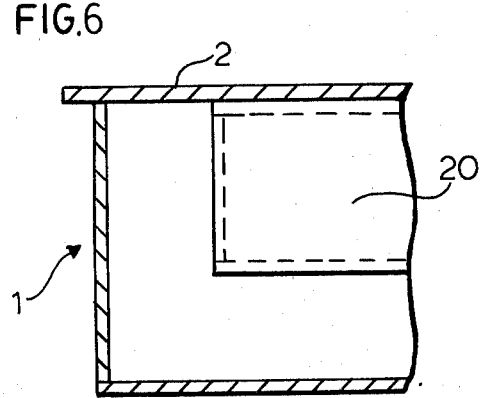

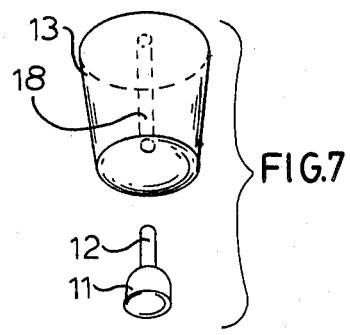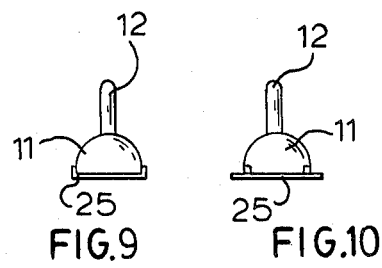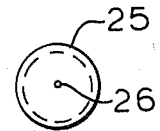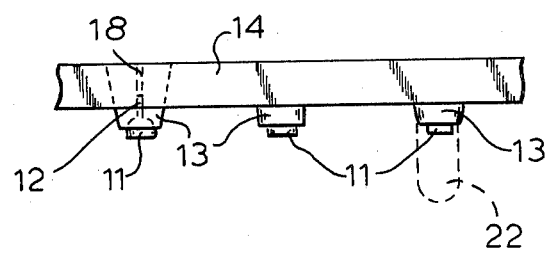

APPARATUS FOR BREEDING QUEEN HONEYBEES

The present invention relates to apparatus of breeding queen honeybees from female bee larvae in cells with synthetic breeding cups.

In the breeding of bees, it has become conventional to breed queen bees by transferring female larvae from workers' cells into synthetic breeding cells where they are nursed and brought up. In this transfer, the larvae are removed from their cells by means of a special spoon or needle, the cells sometimes being shortened beforehand to make the larvae better visible and to facilitate their removal, the larvae are set in synthetic cups, and these cups are arranged in a breeding frame with which they are brought to the nursing population where the breeding cells are built up when the larvae are begun to be nursed. As is known, the queens are developed by different care in the breeding cells as compared to the larvae in the worker's cells, i.e. by supplying them with different fodder juices. However, the transfer with the known special spoons or needles, which may be used with a magnifying glass or may even be equipped with a magnifying glass, is relatively difficult.

It is the primary object of this invention to provide an apparatus which considerably facilitates the breeding of queen bees and which makes a seamless breeding of queen bees from the egg possible.

The above and other objects are accomplished in accordance with the invention with an apparatus comprising a breeding frame, a honeycomb cell plate, which is preferably of synthetic resin, such as polystyrene, the plate having a front face and a rear face and being affixed to the breeding frame, and a multiplicity of sockets projecting from the rear face of the honeycomb cell plate. The plate defines a like multiplicity of open cells extending from the front face through the sockets, and cup-shaped elements are displaceably mounted on the sockets for closing the cells at the rear face.

The above and other objects, features and advantages of the present invention will become more apparent from the following detailed description of certain now preferred embodiments thereof, taken in conjunction with the partially schematic drawing wherein FIG. 1 is a front elevational view of a generally conventional breeding frame with an auxiliary frame affixed thereto and carrying a honeycomb cell plate;

FIG. 2 is a partial vertical section along line II—II of FIG. 1, showing a portion of the honeycomb cell plates and its auxiliary carrying frame, this figure also illustrating a wax plate affixed to the front face of the honeycomb cell plate;

FIG. 3 is a top view of a portion of the wax plate;

FIG. 4 is a sectional view similar to that of FIG. 2 but on a larger scale, showing a modified embodiment of the rearwardly projecting socket forming the cell and its cup-shaped closing element;

FIG. 5 illustrates a portion of the breeding frame with the honeycomb cell plate according to FIG. 1, a screen being arranged in front of the honeycomb cell plate;

FIG. 6 shows the same portion of the breeding frame and honeycomb cell plate, with a protective plate being affixed to the apparatus in front of the honeycomb cell plate;

FIG. 7 is a perspective view illustrating a stopper-like breeding frame insert defining an axial bore above a cup-shaped closing element with a rearwardly projecting handle;

FIG. 8 is a partial side elevational view of a breeding frame with such inserts and cup-shaped closing elements;

FIGS. 9 and 10 schematically represent, respectively, an axial section and a side view of a cup-shaped closing element equipped with a closing cap; and FIG. 11 is a front view of the closing cap of FIG. 10 to illustrate a venting hole in the cap.

Referring now to the drawing and first to FIG. 1, the apparatus for breeding queen honeybees in cells comprises generally conventional breeding frame 1 having upper carrying ledge 2 for mounting the breeding frame in breeding boxes. As schematically shown at 3 in FIG. 1, the bees construct honeycombs in this frame.

Smaller, rectangular auxiliary frame 4 is arranged in breeding frame 1. The upper edge of the auxiliary frame is affixed to carrying ledge 2, for instance by being nailed or screwed thereto. Honeycomb cell plate 5 is arranged in auxiliary frame 4 and may be affixed to auxiliary frame 4 along its edge by bee's wax. Plate 5 is of synthetic resin, for example polystyrene. As shown in FIGS. 2 and 4, a multiplicity of sockets 8 project from the rear face of honeycomb cell plate 5 and the plate defines a like multiplicity of open cells 7 extending from the openings 6 in the front face thereof through sockets 8. For clarification, the open cells are shown spaced relatively far apart in FIG. 1 but, in actuality, they are distributed over the honeycomb cell plate as closely spaced as possible. As shown in the drawing, the honeycomb cell plate extends in a substantially vertical plane and elongated cells 7 have longitudinal axes 9 inclined downwardly from the front to the rear face of plate 5. The preferred angle of inclination of longitudinal cell axes 9 is about 5° to 10° from the horizontal, preferably from 6° to 7°. In FIG. 1, cell openings 6 are shown only schematically and not to scale, the cell openings and corresponding cells being not only much more closely spaced but also of much smaller diameter than illustrated. To exemplify the approximate actual magnitudes proven to be effective in practice, it may be noted that the internal dimensions of breeding frame 4 may be, for instance, 9×19 cm, the width or diameter of open cells 7 may be about 5 mm, the cells being arranged in vertically staggered rows, with seven or eight cells to the row. The spacing between cells 7 is essentially determined by the thickness of the material forming sockets 8 as well as the wall thickness of cup-shaped elements 11 displaceably mounted on sockets 8 for closing open cells 7 at the rear face of honeycomb cell plate 5.

The cup-shaped closing elements are preferably also of synthetic resin, for example polyethylene, and are shown in the preferred embodiment to comprise axially extending handle 12 projecting from a rear side thereof. The cup-shaped closing element handles may define axial capillary bore 15 which communicates with the interior of cup-shaped closing element 11 and enables fodder juice to be sucked out of it. The capillary nature of bore 15 prevents any fodder juice from running out of cup 11 unless vacuum is applied thereto. The handles facilitate the placing and the removal of the closing elements as well as the mounting of the elements in frusto-conical inserts 13 of conventional breeding frames 14 (see FIGS. 7 and 8).

As shown in the preferred embodiments illustrated herein, sockets 8 are substantially cylindrical and have conically rounded beveled rear ends conforming to an inner bottom wall portion of cup-shaped closing elements 11 for providing a smooth closure of the cells whereby a substantially smooth transition is formed between the inner wall of the cells along the sockets and the inner wall of the cup-shaped elements mounted thereon. In this manner, cups 11 form an accurate friction-fit with the sockets and are held firmly thereon without any recesses being formed (see FIG. 4).

As desired, cells 7 may be hexagonal in cross section to correspond to natural honeycomb cells but they may also be of circular or slightly elliptic cross section. A circular or elliptical cross section is preferred because it is easier to manufacture and also facilitates the fit of the closing cup-shaped element over the rear end of the cell. Practice has shown that the queen bees lay their eggs readily in round cells, too.

As shown in FIGS. 2 and 3, honeycomb cell plate 5 comprises a stamping on the front face thereof, the stamping corresponding to a hexagonally structured stamping of intermediate wax plate 16. The wax plate is mounted directly on the front face of the honeycomb cell plate and defines openings 17 in registry with open cells 7 in the honeycomb cell plate. The illustrated openings in wax plate 16 are hexagonal. The sheet-like wax plate may be pressed or rolled from bee's wax and such wax plates are known for use as so-called intermediate walls for a honeycomb. Originally, the wax plate is free of holes, the hexagonally structured plate being shown in FIG. 3 in chain-dotted lines. The hexagonal lines somewhat project from the plate of plate 16 and the hexagonal structure is so staggered on the rear face from the front face that the corners of a hexagon are in the centers of three adjoining hexagons. Some of these hexagonal fields are opened to define openings 17. As schematically shown at 11', the cup-shaped closing elements mounted on the sockets projecting rearwardly from honeycomb cell plate 5 define the minimum spacing between openings 17 and cell openings 6.

In operation, honeycomb cell plate 5 in auxiliary frame 4 is affixed to carrying ledge 2 of breeding frame 1. The worker bees of the breeding population build honeycombs from wax on honeycomb cell plate 5 as well as around auxiliary frame 4 in breeding frame 1, as shown at 3, or an artificial or "half" honeycomb is applied to the front face of the honeycomb cell plate, as is known. The queen bee selected as the breeding mother lays her eggs in the respective honeycomb cells. For this purpose, the queen bee is locked in by means of a screen spaced from the front face of the honeycomb cell plate and mounted thereon. For example, the screen may be screwed to the auxiliary frame of the honeycomb cell plate and the worker bees may tend to the queen bee through the openings in the screen while the screen mesh is so dimensioned that the queen bee cannot escape through the screen openings. Immediately after the eggs have been laid, the screen is taken off, the queen bee and other bees are removed, and a protective plate is mounted over the honeycomb cell plate, for instance by affixing it to its auxiliary frame, i.e. the breeding frame with the honeycomb cell plate is brought from the breeding population to the nursing population. The protective plate is removed about one day before the eggs open and the larvae slip out, and after the eggs have burst, the nursing population immediately starts to take care of the larvae. Cup-shaped closing elements 11 are now removed from sockets 8 and cups 11, which contain larvae, are arranged in a breeding frame in a vertical position within the same nursing population, the breeding cells being built up in the frame in a conventional manner. As is known, larvae having an age of 12 to 18 hours are preferably used for this purpose.

The provision of handles on the cup-shaped closing elements greatly facilitates their handling and, if they define capillary axial bores, fodder juice may be sucked from the interior of the elements by vacuum pressure.

Since the honeycomb cell plate is preferably of synthetic resin and the bees may consider this material foreign to their natural environment, this may sometimes result in an irregular honeycomb structure. It is, therefore, advantageous to mount wax plate 16 on the front face of honeycomb cell plate 5 to facilitate the laying of the eggs and the building of the honeycomb by the bees. If desired, a bee's wax layer may be sprayed on the front face of the honeycomb cell plate. It may also be desirable, to admix a minor amount of bee's wax, for example up to 2%, by weight, to the synthetic resin of which the honeycomb cell plate is made. The laying of the eggs in cells 7 will be facilitated by the illustrated downward inclination of the cells. The smooth fit of cup-shaped closing element 11 with socket 8 will approximate the natural smoothness of a honeycomb cell so that the queen bee is not irritated during the laying of the eggs.

I have made a polystyrene honeycomb cell plate measuring 19×9 cm and defining cylindrical cells having a diameter of 5 mm and an axial length of 9.5 mm. The plate had a gauge (thickness) of 2.3 mm and the length of sockets 8 projecting from the rear face of plate 5 in the direction of horizontal 10 (see FIG. 2) was 7.2 mm. The plate had 17 vertical rows of seven cells each, each row being staggered from the adjoining rows by a distance equal to half the spacing between the centers of the cells in the row, the centers of each three cells being arranged to form an equilateral triangle. The outer diameter of sockets 8 immediately adjacent plate 5 was 9 mm.

Cups 11 are preferably of a synthetic resin which is a little softer than the synthetic resin of the honeycomb cell plate, preferably polyethylene, and the wall thickness of the cups may be, for example, between 0.5 and 1 mm. The length of handles 12 is not critical and may be, for example, in the range of 6 to 10 mm, particularly 8 mm.

As shown in FIGS. 7 and 8, stopper-like inserts 13 of frusto-conical shape may be placed in openings in breeding frame 14, the inserts having axial bores 18 receiving handles 12 of cups 11.

As explained hereinabove, breeding frame 1 with honeycomb cell plate 5 held in auxiliary frame 4 in the illustrated emvobodiment is suspended in the breeding population when breeding of queen bees is desired. The queen bee selected as breeding mother is then locked in the honeycomb cell plate by placing screen 19 thereover (see FIGS. 2 and 5) so that the bee lays her eggs in cells 7. As shown in the drawing, the screen may be screwed or otherwise fastened to the frame of auxiliary frame 4. Screen 19 defines elongated slots 21 having, for example, a width of 4 mm and a length of 3 to 4 mm, which enable the queen bee to receive care from other bees.

Immediately after the eggs have been laid, screen 19 is removed and solid, i.e. unperforated, protective plate 20 is mounted in a similar manner as screen 19 (see broken lines in FIG. 2). Breeding frame 1 with honeycomb cell plate 5 defining cells 7 protected by plate 20 and closed at their rear ends by cups 11 is then brought from the breeding population to the nursing population. About a day before the eggs burst and the larvae slip out of the broken eggs, protective plate 20 is removed. Breeding larvae are then selected from the emerged larvae and, at an age of 12 to 18 hours, the selected larvae are brought into breeding frame 14 (see FIG. 8), cups 11, which hold the selected breeding larvae, being removed from sockets 8 and set in inserts 13 of breeding frame 14, the breeding cups being held in position by inserting handles 12 into insert bores 18. As schematically shown in broken lines in FIG. 8, the breeding cells 22 are then built up on frame 14.

In an alternative procedure, it is also possible to remove the individual cup-shaped elements from the honeycomb cell plate immediately after the queen bee has laid her eggs therein, to close the cup-shaped element with a detachable closure, such as a cap, stopper or the like, and to place the closed cup containing the eggs directly in breeding frame 14 in the nursing population. In this procedure, the closed breeding cups are vertically positioned in the breeding frame and, when the larvae emerge, the closures are removed from the cups so that the breeding cells are built up in the above-described manner. FIGS. 9 to 11 show such a detachable closure 25 for breeding cup 11, this closure defining air vent 26 to maintain the ambient atmosphere in the closed cup.

Experience has shown that the emerging larvae are immediately nursed in the described procedures and the nursing bees immediately proceed with the building of the nursing cells. Thus, the apparatus enables the female bee larvae to be transferred in a simple manner from the breeding population to the nursing population so that queen bees may be bred without the complex prior art procedures.

The honeycomb construction by the worker bees on plate 5 is facilitated by providing rim 23 surrounding each open cell 7 and projecting from the front face of the honeycomb cell plate to define an inlet opening for each cell, as shown in FIG. 4. These projecting rims serve as sockets for the build-up of honeycomb cells of wax. In this case, no wax plate 16 is needed and experiments have shown that a wax plate may be omitted even if no rims surround the open breeding cells.

It has been found that a honeycomb cell plate of polystyrene or like synthetic resin containing up to about 2%, by weight, of bee's wax may be readily injection molded. If desired, such a plate may be sprayed with bee's wax or an intermediate wax plate may be mounted on its front face to facilitate the building of the wax honeycomb by the bees, as described hereinabove.

As shown in broken lines in FIG. 4, sockets 8 and rims 23 may be constituted by separate sleeves friction-fitted into openings 6 of plate 5. The sleeve inserts may have a conical circumference seated in conformingly conical openings 6 to provide a solid seat for the inserts in the plate. The cross sections of the conical seat taper from the front to the rear face of the plate to prevent removal of the inserts from the plate openings when cup-shaped closing elements 11 are taken off.

What is claimed is:

1. An apparatus for breeding queen honeybees in cells, which comprises a breeding frame, a honeycomb cell plate having a front face and a rear face, the honeycomb cell plate being affixed to the breeding frame, a multiplicity of tubular sockets projecting from the rear face of the honeycomb cell plate, the plate defining a like multiplicity of open cells extending from the front face through the cell plate, with each cell aligned with a socket such that an opening is formed extending completely through the cell plate and socket, and cup-shaped elements displaceably mounted on the sockets for closing the cells at the rear face.

2. The breeding apparatus of claim 1, wherein the honeycomb cell plate is of synthetic resin.

3. The breeding apparatus of claim 2, wherein the synthetic resin is polystyrene.

4. The breeding apparatus of claim 2 or 3, wherein the synthetic resin has admixed thereto a minor amount of bee's wax.

5. The breeding apparatus of claim 4, wherein up to 2% by weight, of bee's wax is admixed to the synthetic resin.

6. The breeding apparatus of claim 1 or 2, wherein the cup-shaped closing elements are of synthetic resin.

7. The breeding apparatus of claim 6, wherein the synthetic resin is polyethylene.

8. The breeding apparatus of claim 1, wherein each of the cup-shaped closing elements comprises a handle projecting from a rear side thereof.

9. The breeding apparatus of claim 8, wherein the handle of the cup-shaped closing elements defines an axial capillary bore.

10. The breeding apparatus of claim 1, further comprising a rim surrounding each open cell and projecting from the front face of the honeycomb cell plate to define an inlet opening for each cell.

11. The breeding apparatus of claim 1, wherein the honeycomb cell plate comprises a stamping on the front face thereof, the stamping corresponding to a hexagonally structured stamping of an intermediate wall wax plate.

12. The breeding apparatus of claim 1, further comprising a wax plate mounted directly on the front face of the honeycomb cell plate, the wax plate defining openings in registry with the open cells in the honeycomb cell plate.

13. The breeding apparatus of claim 12, wherein the openings in the wax plate are hexagonal.

14. The breeding apparatus of claim 1, further comprising a bee's wax layer sprayed on the front face of the honeycomb cell plate.

15. The breeding apparatus of claim 1, wherein the cells in the honeycomb cell plate are hexagonal in cross section.

16. The breeding apparatus of claim 1, wherein the cells in the honeycomb cell plate are circular in cross section.

17. The breeding apparatus of claim 1, wherein the cells in the honeycomb cell plate are elliptical in cross section.

18. The breeding apparatus of claim 1, wherein the honeycomb cell plate extends in a substantially vertical plane and the cells have longitudinal axes inclined downwardly from the front to the rear face of the plate.

19. The breeding apparatus of claim 18, wherein the angle of inclination of the longitudinal cell axes is about 5° to 10° from the horizontal.

20. The breeding apparatus of claim 19, wherein the angle of inclination is from 6° to 7°.

21. The breeding apparatus of claim 1, wherein the sockets have conically rounded beveled rear ends conforming to an inner bottom wall portion of the cup-shaped closing elements for providing a smooth closure of the cells whereby a substantially smooth transition is formed between the inner wall of the cells along the sockets and the inner wall of the cup-shaped elements mounted thereon.

22. The breeding apparatus of claim 1, further comprising an auxiliary frame carrying the honeycomb cell plate, the auxiliary frame being affixed to the breeding frame.

23. The breeding apparatus of claim 22, further comprising a screen spaced from the front face of the honeycomb cell plate.

24. The breeding apparatus of claim 1 or 23, further comprising a protective plate associated with the honeycomb cell plate.

25. The breeding apparatus of claim 1, further comprising a detachable closure for the cup-shaped closing elements.

* * * * *